(12) United States Patent
Mollinger et al.

(10) Patent No.: US 7,984,597 B2
(45) Date of Patent: *Jul. 26, 2011

(54) VINYL SIDING

(75) Inventors: Paul J. Mollinger, Blacklick, OH (US); Larry R. Fairbanks, Columbus, OH (US); Samuel W. DeWorth, Pickerington, OH (US); Paul R. Pelfrey, Wheelersburg, OH (US)

(73) Assignee: Exterior Portfolio, LLC, Atlanta, GA (US)

( * ) Notice: Subject to any disclaimer, the term of this patent is extended or adjusted under 35 U.S.C. 154(b) by 553 days.

This patent is subject to a terminal disclaimer.

(21) Appl. No.: 10/282,757

(22) Filed: Oct. 29, 2002

(65) Prior Publication Data

US 2003/0131551 A1 Jul. 17, 2003

Related U.S. Application Data

(63) Continuation-in-part of application No. 09/751,185, filed on Dec. 29, 2000, now Pat. No. 7,204,062, which is a continuation of application No. 29/133,077, filed on Nov. 20, 2000, now Pat. No. Des. 450,138, application No. 10/282,757, which is a continuation-in-part of application No. 29/154,569, filed on Jan. 24, 2002, now Pat. No. Des. 471,292.

(51) Int. Cl.
*E04D 1/12* (2006.01)
*E04D 3/00* (2006.01)

(52) U.S. Cl. ............... 52/555; 52/518; 52/540; 52/520; 52/554; 52/519

(58) Field of Classification Search ............ 52/518, 52/519, 523, 528, 529, 536, 539, 540, 520, 52/534, 543, 556, 545, 555, 554, 302.3, 533, 302.1

See application file for complete search history.

(56) References Cited

U.S. PATENT DOCUMENTS

| 1,589,675 A | 6/1926 | Belding | 52/522 |
| 1,728,934 A | 9/1929 | Hogenson | 206/322 |
| 2,830,546 A | 4/1958 | Rippe | 108/17 |
| D196,230 S | 9/1963 | Raftery et al. | D25/141 |
| 3,159,943 A | 12/1964 | Sugar et al. | 50/200 |

(Continued)

FOREIGN PATENT DOCUMENTS

CA 96829 8/2002

(Continued)

OTHER PUBLICATIONS

Engineering drawing dated Feb. 28, 2002 of a portion of the sample of the known siding panel.

(Continued)

*Primary Examiner* — Phi Dieu Tran A
(74) *Attorney, Agent, or Firm* — Standley Law Group LLP

(57) ABSTRACT

The present invention is a vinyl siding panel and a method of making the vinyl siding panel. One embodiment of the vinyl siding panel comprises a planar row extending the longitudinal length of the vinyl siding panel. The siding panel may also have a slightly curved row. A reinforcement panel may be secured to the siding panel. In such case, the slightly curved row of siding may be secured to a planar portion of the reinforcement panel. In addition, an intermediate portion of the siding panel may be thicker than the outer portions of the siding panel.

13 Claims, 9 Drawing Sheets

U.S. PATENT DOCUMENTS

| | | | |
|---|---|---|---|
| 3,233,382 A | 2/1966 | Graveley, Jr. | 52/522 |
| 3,246,436 A | 4/1966 | Roush | 52/303 |
| 3,289,365 A | 12/1966 | McLaughlin et al. | 52/173 |
| 3,289,380 A | 12/1966 | Chamiga, Jr. | 52/716 |
| 3,325,952 A | 6/1967 | Trachtenberg | 52/276 |
| D208,251 S | 8/1967 | Facer | D13/1 |
| 3,387,418 A | 6/1968 | Tyrer | 52/242 |
| 3,399,916 A | 9/1968 | Ensor | 287/189.36 |
| 3,473,274 A | 10/1969 | Godes | 52/127 |
| 3,520,099 A | 7/1970 | Mattes | 52/531 |
| 3,552,078 A | 1/1971 | Mattes | 52/520 |
| 3,555,762 A | 1/1971 | Costanzo, Jr. | 52/588 |
| 3,637,459 A | 1/1972 | Parish et al. | 161/161 |
| 3,703,795 A | 11/1972 | Mattes | 52/521 |
| 3,815,310 A | 6/1974 | Kessler | 52/531 |
| 3,826,054 A | 7/1974 | Culpepper, Jr. | 52/309 |
| 3,969,866 A | 7/1976 | Kyne | 52/588 |
| 3,970,502 A | 7/1976 | Turner | 156/310 |
| 4,001,997 A | 1/1977 | Saltzman | 52/521 |
| 4,033,802 A | 7/1977 | Culpepper, Jr. et al. | 156/71 |
| 4,034,528 A | 7/1977 | Sanders et al. | 52/309.4 |
| 4,048,101 A | 9/1977 | Nakamachi et al. | |
| 4,081,939 A | 4/1978 | Culpepper, Jr. et al. | 52/535 |
| 4,096,011 A | 6/1978 | Sanders et al. | 156/196 |
| 4,102,106 A | 7/1978 | Golder et al. | 52/533 |
| 4,104,841 A | 8/1978 | Naz | 52/519 |
| 4,118,166 A | 10/1978 | Bartrum | 425/462 |
| 4,188,762 A | 2/1980 | Tellman | 52/541 |
| 4,189,885 A | 2/1980 | Fritz | 52/287 |
| 4,272,576 A | 6/1981 | Britson | 428/100 |
| 4,279,106 A | 7/1981 | Gleason et al. | 52/100 |
| 4,280,311 A * | 7/1981 | Lockard | 52/748.11 |
| 4,319,439 A | 3/1982 | Gussow | 52/288 |
| 4,320,613 A | 3/1982 | Kaufman | 52/521 |
| 4,327,528 A | 5/1982 | Fritz | 52/309.1 |
| 4,389,824 A | 6/1983 | Anderson | 52/211 |
| 4,424,655 A | 1/1984 | Trostle | 52/520 |
| 4,429,503 A | 2/1984 | Holliday | 52/410 |
| 4,450,665 A | 5/1984 | Katz | 52/522 |
| D274,947 S | 7/1984 | Culpepper, Jr. et al. | D25/73 |
| 4,492,064 A | 1/1985 | Bynoe | |
| 4,506,486 A * | 3/1985 | Culpepper, Jr. et al. | 52/529 |
| 4,593,512 A | 6/1986 | Funaki | 52/519 |
| 4,608,800 A | 9/1986 | Fredette | 52/656 |
| 4,649,008 A | 3/1987 | Johnstone et al. | 264/177.1 |
| 4,680,911 A | 7/1987 | Davis et al. | 52/521 |
| D291,249 S | 8/1987 | Manning | D25/73 |
| 4,694,628 A | 9/1987 | Vondergoltz et al. | 52/528 |
| 4,709,519 A | 12/1987 | Liefer et al. | 52/98 |
| 4,716,645 A | 1/1988 | Pittman et al. | 29/527.1 |
| 4,782,638 A | 11/1988 | Hovind | 52/547 |
| 4,814,413 A | 3/1989 | Thibaut et al. | 528/80 |
| 4,843,790 A | 7/1989 | Taravella | 52/211 |
| 4,856,975 A | 8/1989 | Gearhart | 425/131.1 |
| 4,864,788 A | 9/1989 | Tippmann | 52/309.8 |
| 4,911,628 A | 3/1990 | Heilmayr et al. | 425/131.1 |
| 4,920,709 A | 5/1990 | Garries et al. | 52/85 |
| 4,930,287 A | 6/1990 | Volk et al. | 52/748 |
| 4,962,622 A | 10/1990 | Albrecht et al. | 52/630 |
| 4,969,302 A | 11/1990 | Coggan et al. | 52/309.8 |
| D316,299 S | 4/1991 | Hurlburt | D25/119 |
| 5,016,415 A | 5/1991 | Kellis | 52/522 |
| 5,022,204 A | 6/1991 | Anderson | 52/211 |
| 5,022,207 A | 6/1991 | Hartnett | 52/537 |
| 5,024,045 A | 6/1991 | Fluent et al. | 53/443 |
| 5,050,357 A | 9/1991 | Lawson | 52/314 |
| 5,080,950 A | 1/1992 | Burke | 428/81 |
| 5,090,174 A | 2/1992 | Fragale | 52/309.9 |
| 5,103,612 A | 4/1992 | Wright | 52/288 |
| 5,224,315 A | 7/1993 | Winter, IV | 52/309.8 |
| 5,230,377 A | 7/1993 | Berman | 160/327 |
| D342,579 S | 12/1993 | Mason | D25/119 |
| 5,282,344 A | 2/1994 | Moore | 52/716.8 |
| 5,303,525 A | 4/1994 | Magee | 52/306 |
| 5,306,548 A | 4/1994 | Zabrocki et al. | 428/215 |
| 5,318,737 A | 6/1994 | Trabert et al. | 264/171 |
| 5,347,784 A | 9/1994 | Crick et al. | 52/520 |
| 5,363,623 A | 11/1994 | King | 52/520 |
| 5,387,381 A | 2/1995 | Saloom | |
| 5,415,921 A | 5/1995 | Grohman | 428/216 |
| D361,138 S | 8/1995 | Moore et al. | D25/119 |
| 5,443,878 A * | 8/1995 | Treloar et al. | 428/60 |
| 5,461,839 A | 10/1995 | Beck | 52/519 |
| 5,465,486 A | 11/1995 | King | 29/897.32 |
| 5,465,543 A * | 11/1995 | Seifert | 52/309.8 |
| 5,475,963 A | 12/1995 | Chelednik | 52/545 |
| 5,482,667 A | 1/1996 | Dunton et al. | 264/136 |
| 5,502,940 A * | 4/1996 | Fifield | 52/309.12 |
| 5,537,791 A | 7/1996 | Champagne | 52/520 |
| 5,542,222 A | 8/1996 | Wilson et al. | |
| 5,548,940 A | 8/1996 | Baldock | 53/430 |
| 5,551,204 A | 9/1996 | Mayrand | 52/795.1 |
| 5,560,170 A | 10/1996 | Ganser et al. | 52/539 |
| 5,564,246 A | 10/1996 | Champagne | 52/548 |
| 5,565,056 A | 10/1996 | Lause et al. | 156/243 |
| 5,575,127 A | 11/1996 | O'Neal | 52/520 |
| 5,581,970 A | 12/1996 | O'Shea | 52/718.01 |
| 5,586,415 A | 12/1996 | Fisher et al. | 52/58 |
| 5,598,677 A | 2/1997 | Rehm, III | 52/407.1 |
| 5,613,337 A * | 3/1997 | Plath et al. | 52/533 |
| 5,622,020 A | 4/1997 | Wood | 52/546 |
| 5,634,314 A | 6/1997 | Champagne | 52/712 |
| 5,651,227 A * | 7/1997 | Anderson | 52/520 |
| 5,661,939 A * | 9/1997 | Coulis et al. | 52/519 |
| 5,662,977 A | 9/1997 | Spain et al. | 428/42.1 |
| 5,664,376 A | 9/1997 | Wilson et al. | |
| 5,675,955 A | 10/1997 | Champagne | 52/521 |
| 5,678,367 A | 10/1997 | Kline | 52/211 |
| 5,694,728 A | 12/1997 | Heath, Jr. et al. | 52/554 |
| 5,720,114 A | 2/1998 | Guerin | 33/451 |
| 5,729,946 A | 3/1998 | Beck | 52/520 |
| 5,737,881 A * | 4/1998 | Stocksieker | 52/90.1 |
| 5,765,333 A | 6/1998 | Cunningham | 52/481.1 |
| 5,768,844 A | 6/1998 | Grace, Sr. et al. | 52/529 |
| 5,791,093 A | 8/1998 | Diamond | 52/36.5 |
| 5,806,185 A | 9/1998 | King | 29/897.32 |
| 5,809,731 A | 9/1998 | Reiss | 52/533 |
| 5,829,206 A | 11/1998 | Bachman | 52/94 |
| 5,836,113 A | 11/1998 | Bachman | 52/94 |
| D402,770 S | 12/1998 | Hendrickson et al. | D25/141 |
| 5,857,303 A | 1/1999 | Beck et al. | 52/520 |
| 5,858,522 A | 1/1999 | Turk et al. | |
| 5,866,054 A | 2/1999 | Dorchester et al. | |
| 5,866,639 A | 2/1999 | Dorchester et al. | 523/171 |
| 5,869,176 A | 2/1999 | Dorchester et al. | |
| 5,878,543 A | 3/1999 | Mowery | 52/519 |
| 5,946,876 A | 9/1999 | Grace, Sr. et al. | 52/520 |
| 5,956,914 A | 9/1999 | Williamson | 52/520 |
| 5,974,756 A * | 11/1999 | Alvarez et al. | 52/553 |
| 6,029,415 A * | 2/2000 | Culpepper et al. | 52/522 |
| 6,035,587 A | 3/2000 | Dressler | 52/97 |
| 6,047,507 A | 4/2000 | Lappin et al. | 52/212 |
| 6,050,041 A | 4/2000 | Mowery et al. | 52/520 |
| 6,086,997 A | 7/2000 | Patel et al. | 428/355 BL |
| D429,009 S | 8/2000 | Ginzel | D25/136 |
| 6,122,877 A | 9/2000 | Hendrickson et al. | 52/520 |
| 6,161,354 A | 12/2000 | Gilbert et al. | 52/520 |
| 6,187,424 B1 | 2/2001 | Kjellqvist et al. | 428/220 |
| 6,195,952 B1 | 3/2001 | Culpepper et al. | 52/522 |
| 6,223,488 B1 | 5/2001 | Pelfrey et al. | 52/302.1 |
| 6,233,890 B1 | 5/2001 | Tonyan | |
| 6,263,574 B1 | 7/2001 | Lubker, II et al. | 29/897.32 |
| 6,272,797 B1 | 8/2001 | Finger | 52/94 |
| D447,820 S | 9/2001 | Grace | D25/119 |
| 6,282,858 B1 | 9/2001 | Swick | 52/533 |
| D448,865 S | 10/2001 | Manning | D25/141 |
| 6,295,777 B1 | 10/2001 | Hunter et al. | 52/519 |
| D450,138 S | 11/2001 | Barber | D25/141 |
| 6,321,500 B1 | 11/2001 | Manning et al. | 52/555 |
| 6,336,988 B1 | 1/2002 | Enlow et al. | 156/238 |
| 6,348,512 B1 | 2/2002 | Adriani | 521/85 |
| D454,962 S | 3/2002 | Grace | D25/119 |
| 6,358,585 B1 | 3/2002 | Wolff | 428/36.6 |
| 6,360,508 B1 | 3/2002 | Pelfrey et al. | 52/520 |
| 6,363,676 B1 | 4/2002 | Martion, III | 52/519 |
| 6,367,220 B1 | 4/2002 | Krause et al. | 52/512 |
| 6,393,792 B1 | 5/2002 | Mowery et al. | |

| | | | |
|---|---|---|---|
| 6,442,912 B1 | 9/2002 | Phillips et al. | 52/741.4 |
| 6,516,577 B2 | 2/2003 | Pelfrey et al. | 52/302.1 |
| D471,292 S | 3/2003 | Barber | D25/141 |
| 6,526,718 B2 | 3/2003 | Manning et al. | 52/555 |
| 6,539,675 B1 | 4/2003 | Gile | 52/96 |
| 6,594,965 B2 | 7/2003 | Coulton | 52/302.1 |
| 6,625,939 B1 | 9/2003 | Beck et al. | 52/105 |
| 6,673,868 B2 | 1/2004 | Choulet | 525/70 |
| 6,716,522 B2 | 4/2004 | Matsumoto et al. | |
| 6,752,941 B2 | 6/2004 | Hills | |
| 6,784,230 B1 | 8/2004 | Patterson et al. | 524/13 |
| 2001/0041256 A1 | 11/2001 | Heilmayr | 428/318.6 |
| 2002/0018907 A1 | 2/2002 | Zehner | 428/537.1 |
| 2002/0020125 A1 | 2/2002 | Pelfrey et al. | 52/302.1 |
| 2002/0025420 A1 | 2/2002 | Wanat et al. | 428/213 |
| 2002/0029537 A1 | 3/2002 | Manning et al. | 52/518 |
| 2002/0054996 A1 | 5/2002 | Rheenen | 428/420 |
| 2002/0056244 A1 | 5/2002 | Hertweck | 52/520 |
| 2002/0076544 A1 | 6/2002 | DeWorth et al. | 428/317.1 |
| 2002/0078650 A1 | 6/2002 | Bullinger et al. | 52/539 |
| 2002/0090471 A1 | 7/2002 | Burger et al. | 428/15 |
| 2002/0108327 A1 | 8/2002 | Shaw | 52/211 |
| 2002/0177658 A1 | 11/2002 | Tajima et al. | 525/85 |
| 2003/0014936 A1 | 1/2003 | Watanabe | 52/518 |
| 2003/0056458 A1 | 3/2003 | Black et al. | 52/541 |
| 2003/0131551 A1 | 7/2003 | Mollinger et al. | 52/518 |
| 2003/0154664 A1 | 8/2003 | Beck et al. | 52/105 |
| 2004/0003566 A1 | 1/2004 | Sicuranza | 52/518 |
| 2004/0026021 A1 | 2/2004 | Groh et al. | 156/244.12 |
| 2004/0142157 A1 | 7/2004 | Melkonian | 428/292.1 |
| 2005/0081468 A1 | 4/2005 | Wilson et al. | |
| 2006/0053740 A1 | 3/2006 | Wilson et al. | |

FOREIGN PATENT DOCUMENTS

| | | |
|---|---|---|
| CA | 2267000 | 4/2003 |
| CL | 3.856 | 5/2001 |
| DE | 4 01 04 760 | 5/2001 |
| EP | 1086 988 A1 | 3/2001 |
| GB | 1068202 | 5/1967 |
| GB | 2101944 | 8/2001 |
| JP | 364001539 A | 1/1989 |
| JP | 09141752 A | 6/1997 |
| JP | 410018555 A | 1/1998 |
| JP | 02001079951 A | 3/2001 |
| KR | 321694 | 3/2003 |
| PL | 4115 | 7/2004 |
| WO | WO 00/55446 | 9/2000 |

OTHER PUBLICATIONS

Three photographs of a portion of an actual sample of the known siding panel.
Heartland Siding, web pages, Siding Profiles, HeartTech Super Polymer Siding, AutumnWood Polymer Siding, Ultra Super Polymer Siding, 4 pages, printed Aug. 27, 2009.
Certainteed, web page, Certainteed Monogram Double 5" Dutchlap, 1 page, printed Aug. 27, 2009.

* cited by examiner

VINYL SIDING

This application is a continuation-in-part of U.S. application Ser. No. 09/751,185, filed Dec. 29, 2000, which is a continuation of U.S. Design application Ser. No. 29/133,077, filed Nov. 20, 2000, now U.S. Design Pat. No. 450,138. This application is also a continuation-in-part of U.S. Design application Ser. No. 29/154,569, filed Jan. 24, 2002, which is a continuation-in-part of U.S. Design application Ser. No. 29/133,077, filed Nov. 20, 2000, now U.S. Design Pat. No. 450,138. The entirety of each of the references is hereby incorporated by reference. In addition, the entirety of U.S. Pat. No. 6,321,500 and U.S. Design Pat. No. 448,865 are hereby incorporated by reference. Furthermore, the entirety of U.S. application Ser. No. 09/737,144 and U.S. application Ser. No. 10/056,986 are hereby incorporated by reference.

BACKGROUND AND SUMMARY OF THE INVENTION

The present invention relates generally to vinyl siding. However, it should be recognized that the present invention also includes siding panels made from other materials. For example, a siding panel of the present invention may be made from any suitable material including, but not limited to, metals, woods, synthetic wood composites, and other plastics.

Vinyl siding may be produced by extruding at least one vinyl composition. For example, vinyl siding can be made by co-extruding a vinyl substrate and a vinyl capstock. The extruded vinyl is passed through a calibrator to obtain a final net shape. However, as the vinyl cools after passing through the calibrator, it has an inherent tendency to oil can. As is well known in the art, oil canning refers to the inherent tendency of a sheet of vinyl to curve in either a concave or convex direction as it cools.

As a result of the oil canning effect, it has been believed by those skilled in the art that it is not possible to produce vinyl siding having at least one relatively flat, planar portion. Thus, the designs of vinyl siding have been limited. Vinyl siding commonly has at least one horizontal row. Each row of the siding is subject to the oil canning effect. Consequently, in order to limit the oil canning effect, it has been tried to limit the width of each row and the height of each seam connecting adjacent rows. Moreover, it is common to produce the vinyl siding such that each row already has a significant amount of curvature as it exits the calibrator so as to minimize the oil canning effect. These design considerations have limited and/or diminished the appearance of the vinyl siding. Therefore, a need exists for an improved vinyl siding panel design as well as an improved method of making vinyl siding.

One embodiment of the present invention is a vinyl siding panel comprising a portion extending the longitudinal length of the vinyl siding panel. The portion comprises a first edge and a second edge. The width from the first edge to the second edge is at least about 3.0 inches. In addition, the portion has a surface variance less than about 0.05 inches relative to an imaginary straight line connecting the first edge and the second edge.

A second embodiment of the present invention is a vinyl siding panel comprising a portion extending the longitudinal length of the vinyl siding panel. The portion comprises a first edge and a second edge, wherein the width from the first edge to the second edge is at least about 3.0 inches. In addition, the radius curvature between the first edge and the second edge is at least about 85 inches.

A third embodiment of the present invention is a method of producing a vinyl siding panel. The method comprises extruding at least one vinyl composition and passing the vinyl composition(s) through a calibrator defining a passageway. The passageway has a first edge and a second edge. The width from the first edge to the second edge is at least about 3.0 inches, and the surface variance is less than about 0.05 inches relative to an imaginary straight line connecting the first edge and the second edge.

A fourth embodiment of the present invention is also a method of producing a vinyl siding panel. In this embodiment, the method comprises extruding at least one vinyl composition. The vinyl is then passed through a calibrator defining a passageway. The passageway has a first edge and a second edge. The width is at least about 3.0 inches from the first edge to the second edge, and the radius curvature between the first edge and the second edge is at least about 85 inches.

A fifth embodiment of the present invention is a siding panel. The siding panel is comprised of at least two rows. A first row has a radius curvature between about 20 inches and about 300 inches. A second row is connected to the first row by a seam (i.e., a step transition) to define a stepped contour. Unlike the first row, the second row has a radius curvature between about 10 inches and about 215 inches, wherein the radius curvature of the first row is greater than the radius curvature of the second row.

In a sixth embodiment of the present invention, a siding panel has a first outer portion, a second outer portion, and an intermediate portion. The first outer portion has a thickness between about 30 mils and about 48 mils. The second outer portion also has a thickness between about 30 mils and about 48 mils. The intermediate portion is situated between the first outer portion and second outer portion, and it has thickness between about 31 mils and about 55 mils. In addition, the thickness of the intermediate portion is greater than the thickness of the first outer portion and the thickness of the second outer portion.

A seventh embodiment of the present invention is a siding unit. The siding unit comprises a reinforcement panel having a portion which is at least about 3 inches wide and has a surface variance less than about 0.05 inch. The siding unit also includes a siding panel secured to the reinforcement panel such that a row of the siding panel is adjacent to the portion of the reinforcement panel. The row of the siding panel has a surface variance of at least about 0.01 inch prior to the siding panel being secured to the reinforcement panel. In addition, the surface variance of the row of the siding panel is greater than the surface variance of the portion of the reinforcement panel prior to the siding panel being secured to the reinforcement panel.

In an eighth embodiment of the present invention, a siding unit comprises a reinforcement panel and a siding panel. The reinforcement panel has a portion which is at least about 3 inches wide and has a surface variance less than about 0.05 inch. The siding panel is secured to the reinforcement panel such that a row of the siding panel is adjacent to the portion of the reinforcement panel. The row of the siding panel has a surface variance of at least about 0.01 inch prior to the siding panel being secured to the reinforcement panel. However, the surface variance of the row of the siding panel is reduced after being secured to the reinforcement panel.

Any embodiment of the present invention may include any optional or preferred feature of any other embodiment of the present invention. In addition to the novel features and advantages mentioned above, other objects and advantages of the present invention will be readily apparent from the following descriptions of the drawings and exemplary embodiments.

DETAILED DESCRIPTION OF EXEMPLARY EMBODIMENT(S)

The present invention is directed to siding. In addition, the present invention includes a method of making siding. The present invention will be described primarily with regard to vinyl siding and an improved method and system for making vinyl siding. However, the present invention also includes siding made from other suitable materials including, but not limited to, woods, metals, synthetic wood composites, and other plastics.

Figure 1:
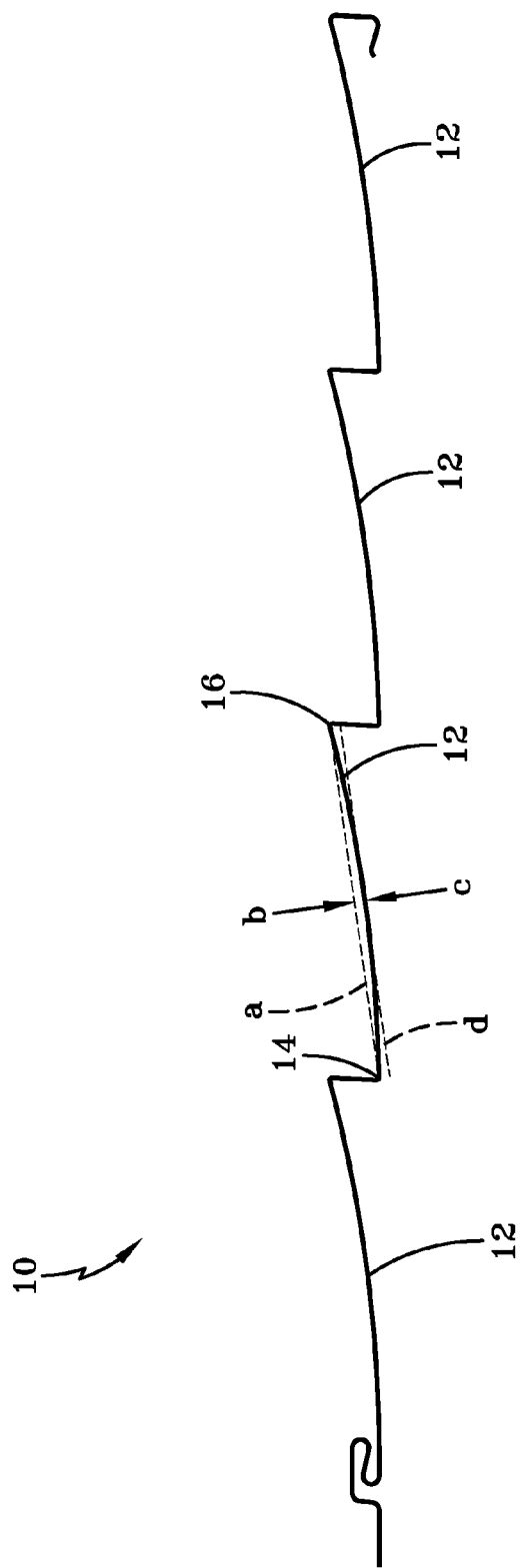
FIG. 1 is a side elevation view of a vinyl siding panel having significantly curved row.

FIG. 1 shows an example of a vinyl siding panel 10 having a plurality of curved rows 12. Each of the rows 12 has an edge 14 and an edge 16. The degree of curvature between edge 14 and edge 16 can be measured in at least a couple different ways. In the first method, an imaginary straight line a is made between edge 14 and edge 16. The surface variance may then be measured between the outer surface of the vinyl siding panel 10 and the line a as indicated by arrow b and arrow c. If the outer surface of the siding panel 10 is not smooth (e.g., the outer surface may be embossed), the surface variance may also be measured between an imaginary straight line d and edge 14 or edge 16. Alternatively, the radius curvature may be measured between edge 14 and edge 16.

Figure 2:
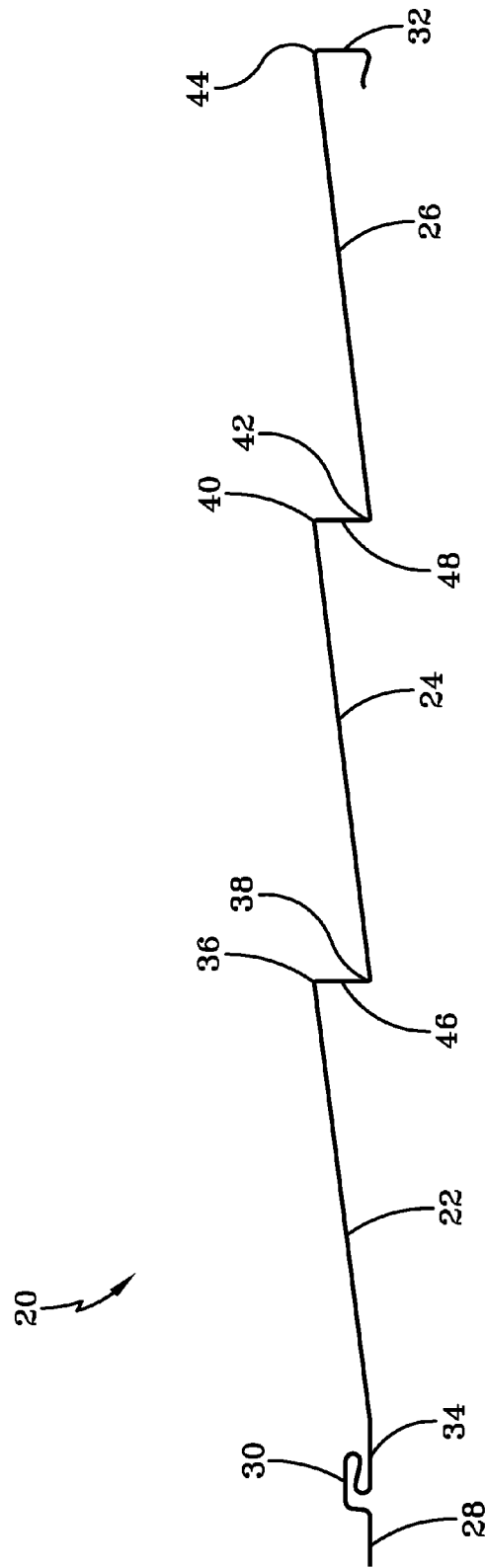
FIG. 2 is a side elevation view of one exemplary embodiment of a vinyl siding panel of the present invention.

FIG. 2 illustrates one example of a vinyl siding panel 20 of the present invention. In this example, the vinyl siding panel 20 is comprised of a row 22, a row 24, and a row 26. In addition, the vinyl siding panel 20 may include a nailing strip 28, a tongue 30, and a groove 32. Nails or any other suitable mechanical fastening means may be extended through apertures in the nailing strip 28 in order to secure the vinyl siding panel 20 to a building structure. The tongue 30 is adapted to fit in the groove of another siding panel when installed on a building structure. Likewise, the groove 32 is adapted to receive the tongue of another siding panel when installed on a building structure. The tongue-and-groove connection may also be referred to as a hanger section.

In this embodiment, each of the rows 22, 24, and 26 is a substantially planar portion. Row 22 has an edge 34 and edge 36. Row 24 has an edge 38 and an edge 40, and row 26 has an edge 42 and an edge 44. The nailing strip 28 and the tongue 30 are connected to the edge 34 of row 22. Edge 36 of row 22 is connected to edge 38 of row 24 by seam 46. Similarly, edge 40 of row 24 is connected to edge 42 of row 26 by seam 48. As a result, this example of the vinyl siding panel 20 has a stepped contour.

As in this example, each of the rows 22, 24, and 26 may be substantially similar. However, it should be recognized that a vinyl siding panel of the present invention may have none or only one relatively straight, planar portion. It should also be recognized that a vinyl siding panel of the present invention may have any plural number of relatively straight, planar portions.

For ease of description, the dimensions of a planar portion of the present invention will be described with regard to row 24 of vinyl siding panel 20. In this example, the width of row 24 from edge 38 to edge 40 is at least about 3.0 inches, more preferably at least about 5.0 inches, and still more preferably at least about 6.0 inches (e.g., 7 or 8 inches). The surface variance of this embodiment, as defined with regard to FIG. 1, from edge 38 to edge 40 is less than about 0.05 inch, more preferably less than about 0.04 inch, and still more preferably less than about 0.03125 inch. In addition, the radius curvature from edge 38 to edge 40 is at least about 85 inches, more preferably at least about 117 inches, and even more preferably at least about 148 inches.

The row 24 may have any desired thickness from its outer surface to its inner surface. However, it is preferred that the row 24 of this embodiment has an average thickness in the range from about 0.04 inch to about 0.05 inch. More preferably, the average thickness of the row 24 is in the range from about 0.041 inch and 0.046 inch.

The inventors have discovered that the height of the seams 46 and 48 may be greater than in conventional vinyl siding. In fact, it is believed that the increased height of the seams 46 and 48 may facilitate the production of the vinyl siding of the present invention. In particular, the height of each of the seams 38 and 40 may be at least about 0.5 inch. More preferably, the height of each of the seams 38 and 40 may be at least about 0.6 inch (e.g., about 0.75 inch or about 0.8 inch).

If desired, a reinforcement panel may be secured to, or positioned behind, the inner surface of the vinyl siding panel 20. For example, a foam reinforcement panel may be secured to the inner surface of the vinyl siding panel 20 by an adhesive. An example of an adhesive is a low temperature adhesive such as neoprene. The reinforcement panel may tend to further straighten out rows 22, 24 and 26 of the vinyl siding panel 20. Nevertheless, it should be recognized that the dimensions of the planar portion(s) discussed above are taken prior to the application of a reinforcement panel or any other straightening means.

Figure 4:
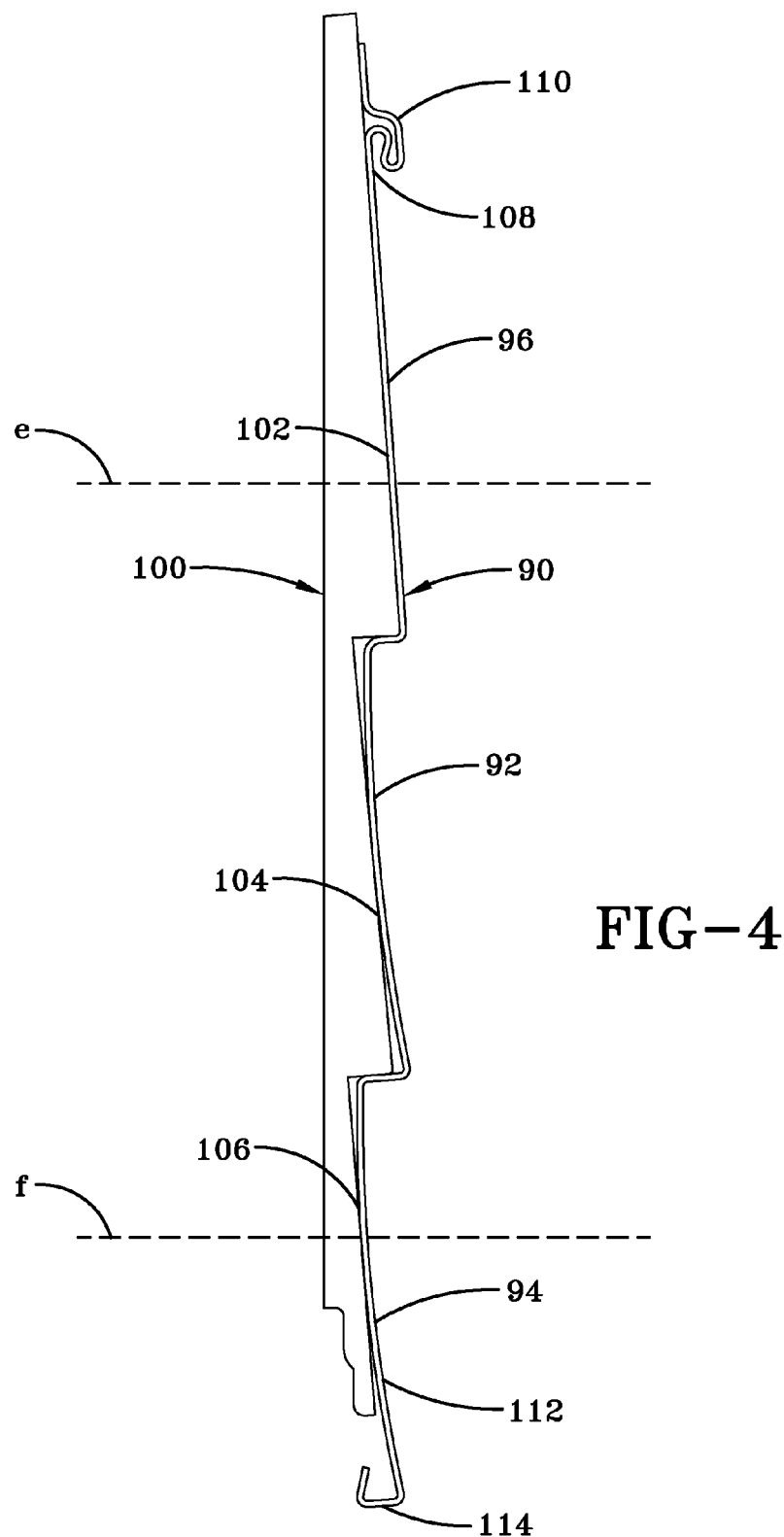
FIG. 4 is a side elevation view of one exemplary embodiment of a siding panel of the present invention.

Another embodiment of a siding panel of the present invention is shown in FIG. 4. This siding panel 90 may include any of the optional or preferred features of the other embodiments of the present invention. The siding panel 90 may have at least one row with a radius curvature between about 10 inches and about 215 inches. This embodiment of the siding panel 90 may also have at least one row with a radius curvature between about 20 inches and about 300 inches. It should be recognized that other embodiments of the siding panel may include additional curved or planar rows. In the example shown in FIG. 4, row 92 and row 94 each have a radius curvature between about 10 inches and about 215 inches, and row 96 has a radius curvature between about 20 inches and about 300 inches. Row 92 and row 94 may have a similar curvature if desired. For reasons discussed below, row 96 may have a lower surface variance and higher radius curvature than row 92 and row 94.

Each of the rows may have any desired width. In an exemplary embodiment of the siding panel 90, each of the rows may have a width between about 3 inches and about 8 inches. For an example of a siding panel 90 having 3-inch rows, the radius curvature of rows 92 and 94 may be between about 10 inches and about 50 inches, and the radius curvature of row 96 may be between about 20 inches and about 60 inches. On the other hand, for an exemplary embodiment of a siding panel 90 having 8-inch rows, the radius curvature of rows 92 and 94 may be between about 70 inches and about 215 inches, and the radius curvature of row 96 may be between about 90 inches and 300 inches.

Furthermore, in an exemplary embodiment of the siding panel 90, the surface variance of each of the rows may be between about 0.01 inch and about 0.1 inch. For instance, the surface variance of each of the rows may be between about 0.015 inch and about 0.089 inch. It should be recognized that the rows may have the same surface variance or different surface variances. For example, rows 92 and 94 may have surface variances greater than about 0.05 inch, and row 96 may have a surface variance less than about 0.05 inch.

Figure 9:
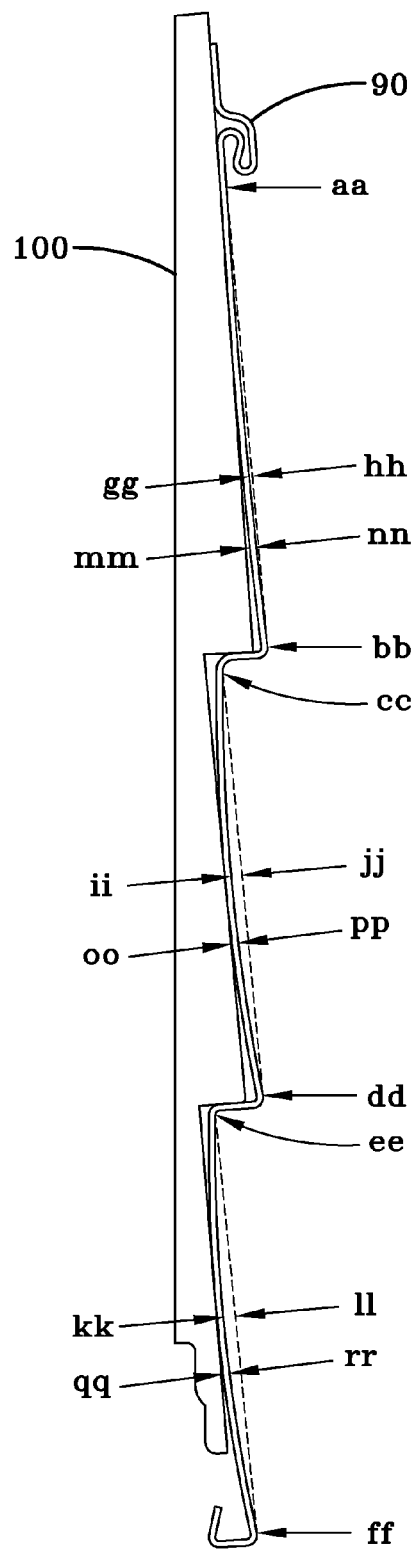
FIG. 9 is another side elevation view of the siding panel of FIG. 4.

FIG. 9 illustrates the surface variances, radius curvatures, and surface thicknesses of siding panel 90. As previously mentioned, the dimensions of siding panel 90 are taken prior to the application of backing panel 100. The radius curvature of the top row is measured between the edges of the top row (as indicated by arrows aa and bb). On the other hand, the surface variance of the top row is measured between the outer surface of the siding panel 90 (as indicated by arrow gg) and an imaginary straight line extending between the edges of the top row (as indicated by arrows aa and bb). In addition, the thickness of the top row is measured between the inner surface (as indicated by arrow mm) and the outer surface (as indicated by arrow nn) of the top row. The dimensions of the other rows of siding panel 90 may be measured in a similar manner. In particular, the radius curvature of the middle row is measured between arrows cc and dd, and the radius curvature of the bottom row is measured between arrows ee and ff. Also, the surface variance of the middle row is measured between arrows ii and jj, and the surface variance of the bottom row is measured between arrows kk ad ll. Finally, the thickness of the middle row of siding panel 90 is measured between arrows oo and pp, whereas the thickness of the bottom row is measured between arrows qq and rr.

Optionally, the siding panel 90 may include a reinforcement panel 100. The siding panel 90 may be secured to the reinforcement panel 100 using an adhesive such that each row of the siding panel 90 is adjacent to a respective portion of the reinforcement panel 100. For example, a low temperature adhesive such as neoprene may be used to secure the siding panel 90 to the reinforcement panel 100. In this example, the reinforcement panel 100 has portions 102, 104, and 106 that are secured to rows 96, 92, and 94, respectively. However, a top portion 108 of the siding panel 90 may be allowed to float relative to the reinforcement panel 100. In other words, the top portion 108 may not be secured to the reinforcement panel 100 by an adhesive. Allowing the top portion 108 to float may enable the tongue 110 to be adjusted to engage a groove of an adjacent siding panel when installed. Similarly, a bottom portion 112 of the siding panel 90 may be allowed to float relative to the reinforcement panel 100 to allow the groove 114 to be adjusted to engage a tongue of an adjacent siding panel when installed. Also, a side edge portion of the siding panel 90 may be allowed to float relative to the reinforcement panel 100 such that the side edge portion may be placed in an overlapping arrangement with the side edge portion of an adjacent siding panel when installed. Elsewhere, it is preferred that there is substantially full coverage of the adhesive everywhere it is desired for the siding panel 90 to be adhered to the reinforcement panel 100. Substantially full coverage of the adhesive in these areas may help to limit telegraphing of the adhesive. In addition, substantially full coverage of the adhesive in these areas may help to limit oil canning of the siding panel 90. The adhesive may, for example, be applied by sprayers or rollers to obtain substantially full coverage. Nevertheless, it should be recognized that there may be spot or bead coverage of the adhesive in these areas in lieu of substantially full coverage of the adhesive.

The inventors have achieved surprising and unexpected results by securing a row of the siding panel 90 to a portion of the reinforcement panel 100, wherein the row of the siding panel 90 has a greater surface variance (and/or smaller radius curvature) than the portion of the reinforcement panel 100 prior to the siding panel 90 being secured to the reinforcement panel 100. For example, the portion of the reinforcement panel 100 may have a width of at least about 3 inches and a surface variance less than about 0.05 inch (e.g., the portion may be planar). On the other hand, the row of siding may have a surface variance of at least about 0.01 inch, wherein the surface variance of the row of siding is greater than the surface variance of the respective portion of the reinforcement panel 100 prior to the siding panel 90 being secured to the reinforcement panel 100. Additionally, the radius curvature of the row of siding may be less than the radius curvature of the respective portion of the reinforcement panel 100 prior to the siding panel 90 being secured to the reinforcement panel 100. The surface variance and radius curvature of a portion of a reinforcement panel 100 may be measured in a manner similar to which the surface variance and radius curvature of a siding panel 90 is measured. It should be recognized that a reinforcement panel 100 such as a foam backer may have a slightly uneven surface due to the nature of the materials or method of manufacturing. Accordingly, the surface variance of a reinforcement panel 100 may also be determined by measuring the dimensions of the tool used to shape or form the reinforcement panel 100 (the surface variance of a row of siding may also be measured in this manner). In the example of FIG. 4, portions 104 and 106 of the reinforcement panel 100 are planar, and rows 92 and 94 of the siding panel 90 have higher surface variances and lower radius curvatures than respective corresponding portions 104 and 106. The inventors have discovered that this type of configuration results in an improved seam when the side edge portions of adjacent siding panels are overlapped. In particular, the inventors have discovered that the side edge portions of rows 92 and 94 regain at least a portion of their respective natural curvatures and surface variances at the seam area because the side edge portions are not directly adhered to the reinforcement panel 100. In other words, the differences between the portion of the reinforcement panel 100 and the row of siding results in natural forces in the seam area that tend to resist buckling of the side edge portion of the siding panel. Consequently, this unique combination of features significantly lessens the possibility of a gap between the overlapping side edge portions at the seam between adjacent siding panels. This improves the aesthetic appearance of the siding. In addition, since the rows of siding may only have a slight curvature, the siding may appear very similar to straight face siding to the naked eye. In addition, the step of securing the siding panel 90 to the reinforcement panel 100 may reduce the surface variance and curvature of each row of the siding panel 90 without significantly increasing the likelihood of oil canning, thereby further enhancing the straight face appearance to the naked eye.

Referring again to the embodiment shown in FIG. 4, row 96 of the siding panel 90 and portion 102 of the reinforcement panel 100 may have surface variances less than about 0.05 inch. Since the top portion 108 of the siding panel 90 is allowed to float relative to the reinforcement panel 100, the side edge portion of row 96 also resists buckling. Consequently, there is also a significantly reduced possibility of a gap in the portion of the seam that includes the side edge portion of row 96. In addition, row 96 may still appear to be similar to rows 92 and 94 to the naked eye, thereby resulting in an improved appearance of the siding.

It should be recognized that other configurations of the siding unit are possible. For example, the bottom row of the siding panel may be planar and secured to a planar portion of the reinforcement panel. For another example, the top row of the siding panel may have more curvature and be secured to a planar portion of the reinforcement panel. For still another example, a slightly curved row of the siding panel may be secured to a portion of the reinforcement panel having a similar curvature. In addition, the siding unit may include any number of rows of siding (e.g., less than three or greater than three), and there may be various configurations that include different combinations of the aforementioned features.

The inventors have also discovered other improvements to siding. Any siding panel (including, but not limited to, shake siding and siding having rows) may be considered to have three portions, namely two outer portions and an intermediate portion between the two outer portions. The span of each portion may vary to suit the shape and dimensions of each particular panel. Accordingly, there are no set portions of the siding panel which define the outer portions and the intermediate portion. In some embodiments of the present invention, the intermediate portion may not extend across any seams joining the rows or other portions of the siding panel. In another example, the intermediate portion may extend across one or more seams joining the rows or other portions of the siding panel. Referring to the example of FIG. 4, the boundaries between the outer portions and the intermediate portion are indicated by dashed lines e and f. As can be seen, the intermediate portion in this embodiment extends across the seams joining the rows of siding.

The inventors have discovered that it is beneficial for the intermediate portion to be thicker than the outer portions. In an exemplary embodiment, the intermediate portion is between about 1 mil and about 7 mils thicker than each outer portion, more preferably between about 1 mil and about 4 mils thicker than each outer portion. The extra thickness of the intermediate portion improves the physical characteristics of the siding panel. A surprising and unexpected result is that the outer portions may be thinner without significantly diminishing the physical characteristics of the siding panel, thereby improving the manufacturing cost of the siding. In an exemplary embodiment, each outer portion has a thickness between about 30 mils and about 48 mils, whereas the intermediate portion has a thickness between about 31 mils and about 55 mils. More preferably, the intermediate portion has a thickness between about 43 mils and about 55 mils. This feature of the present may be implemented in a siding panel having any desired height. However, the inventors have discovered that this feature is particularly beneficial for wide body panels. A wide body panel has a height of at least about 12 inches (e.g., 16 inches). In fact, one exemplary embodiment of a wide body panel may have a height of at least 32 inches, and another exemplary embodiment of a wide body panel may have a height of at least about 48 inches.

It is preferred that the siding meets or exceeds the ASTM D3679 standard. The siding of the present invention may be made from any known, suitable, or conventional vinyl composition(s). For example, the vinyl siding may be comprised of a vinyl substrate layer and an optional vinyl capstock layer. The vinyl composition(s) may include one or more additives. For instance, the vinyl composition(s) may include one or more additives to improve processing, durability, weatherability, resistance to ultraviolet (UV) degradation, impact resistance, and other qualities of vinyl siding. An example of a weathering agent is titanium dioxide, and examples of a vinyl substrate composition and a vinyl capstock composition are polyvinyl chloride (PVC) compositions. For instance, these compositions may include the following ingredients in about the following amounts:

| VINYL SUBSTRATE COMPOSITION | |
|---|---|
| PVC resin | 100 |
| Tin Stabilizer(s) | 0.5-2.0 |
| Processing Aid(s) | 0-2.0 |
| Lubricant(s) | 1.5-3.5 |
| Impact Modifier(s) | 2.0-6.0 |
| Mineral Filler(s) | 0-12 |
| Weathering Agent(s) | 0.5-12 |
| Colorant(s) | As Desired |
| VINYL CAPSTOCK COMPOSITION | |
| PVC resin | 100 |
| Tin Stabilizer(s) | 0.5-2.0 |
| Processing Aid(s) | 0-2.0 |
| Lubricant(s) | 1.5-3.5 |
| Impact Modifier(s) | 2.0-6.0 |
| Weathering Agent(s) | 9-11 |
| Colorant(s) | As Desired |

Although the present invention has been described primarily with regard to vinyl siding, alternative embodiments of the present invention include panels made from other extrudable or moldable plastic materials. For example, panels of the present invention may also be made from polystyrene, acrylonitrile-butadiene-styrene (ABS), nylon, ethylene-vinyl acetate (EVA), polycarbonate, polyethylene (PE), polypropylene (PP), polyethylene terephthalate (PET), thermoplastic olefins, acrylonitrile-styrene-acrylic (ASA), other similar or conventional plastics, and alloys, blends, and coextrusions of these resins.

Figure 3:
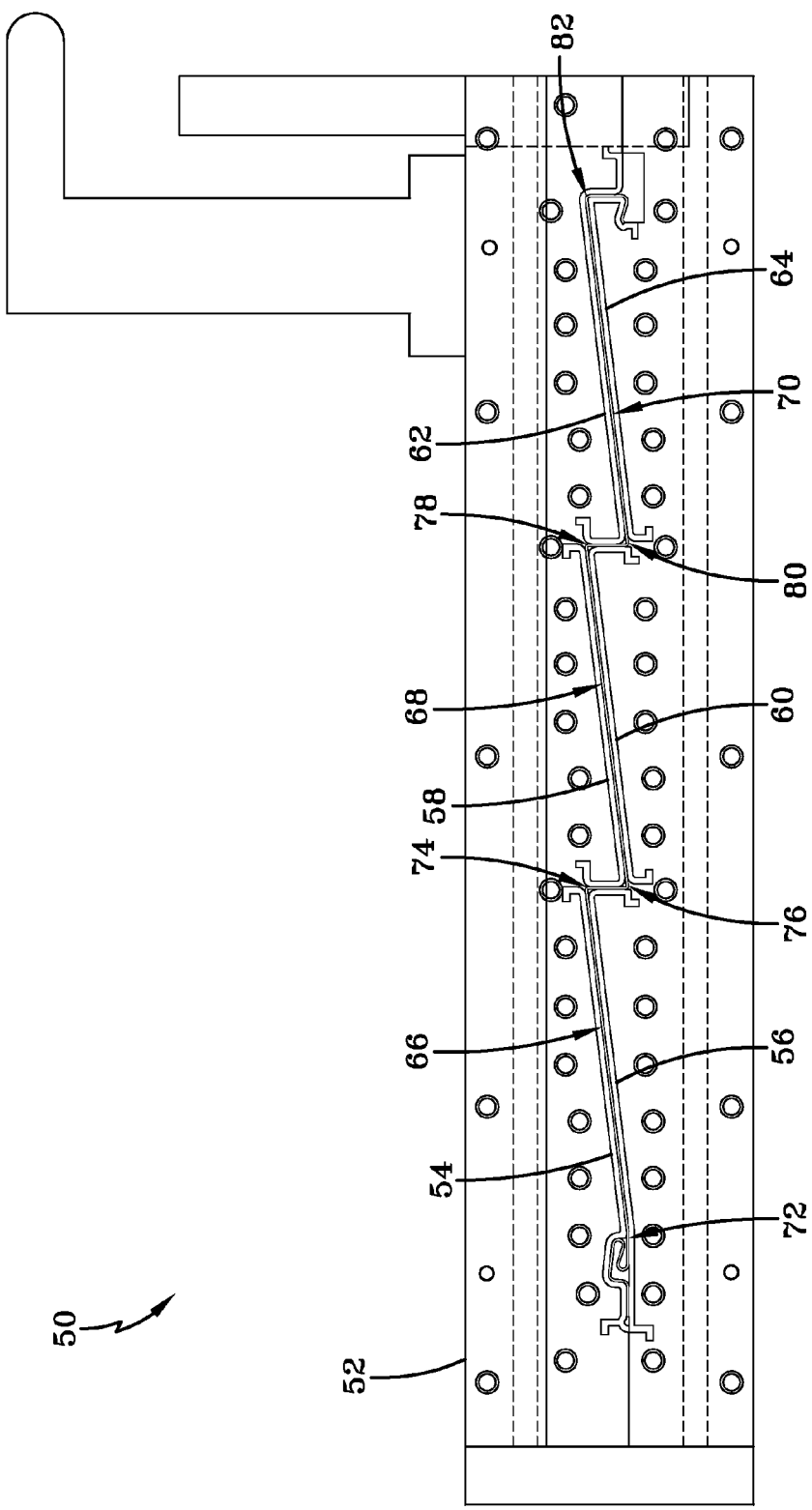
FIG. 3 is a side elevation view of one exemplary embodiment of a calibrator of the present invention.

For example, the vinyl siding of the present invention may be manufactured by extruding at least one vinyl composition. The vinyl is then passed through a calibrator. FIG. 3 shows an example of a calibrator 50. Optionally, a preforming guide, another calibrator, a die, and/or any other desired manufacturing components may be interposed between the extruder and the calibrator 50. The preforming guide and the other calibrator may be used to form the vinyl into the general shape of the vinyl siding, and the calibrator 50 is used to obtain the final net shape of the vinyl siding. However, it should be recognized that the vinyl siding may relax slightly after it exits the calibrator 50 and cools down. The vinyl siding may be passed under at least one embossing roller and at least one cooling roller before and/or after the calibrator 50. In addition, the vinyl siding may be introduced into a cooling bath or cooling spray after exiting the calibrator 50. The embossing roller(s) may be used to give the vinyl siding a wood-grain appearance, and the cooling roller(s) and the cooling bath or spray may be used to further cool down the vinyl siding to limit the effect of oil canning and distortion.

In the example of FIG. 3, the calibrator 50 is comprised of a housing 52 and optional inserts 54, 56, 58, 60, 62, and 64. In addition, the calibrator 50 may include at least one internal conduit to conduct at least one flow of water to help cool the calibrator 50. The flow of water may be any desired temperature, but it is preferably between about 48 and about 52 degrees Fahrenheit. The housing 52 may be comprised of any suitable material such as aluminum, and the inserts 54, 56, 58, 60, 62, and 64 may be comprised of any suitable material such as titanium or ferro-TIC. The inserts 54, 56, 58, 60, 62, and 64 are mounted in the housing 52 and define passageways 66, 68, and 70 corresponding to the portions of the vinyl siding. Alternatively, the housing itself may define the passageways. In addition, it should be recognized that the calibrator 50 may have only one or any plural number of passageways as needed.

Passageway 66 has an edge 72 and edge 74. Passageway 68 has an edge 76 and an edge 78, and passageway 70 has an edge 80 and an edge 82. For ease of description, the dimensions of a passageway of a calibrator of the present invention will be described with regard to passageway 68 of calibrator 50. In one exemplary embodiment, the width of passageway 68 from edge 76 to edge 78 is at least about 3.0 inches, more preferably at least about 5.0 inches, and still more preferably at least about 6.0 inches (e.g., about 8 inches). For a planar portion, the surface variance from edge 76 to edge 78 is less than about 0.05 inch, more preferably less than about 0.04 inch, and still more preferably less than about 0.03125 inch. In addition, the radius curvature for a planar portion from edge 76 to edge 78 is at least about 85 inches, more preferably at least about 117 inches, and even more preferably at least about 148 inches.

Figure 5:
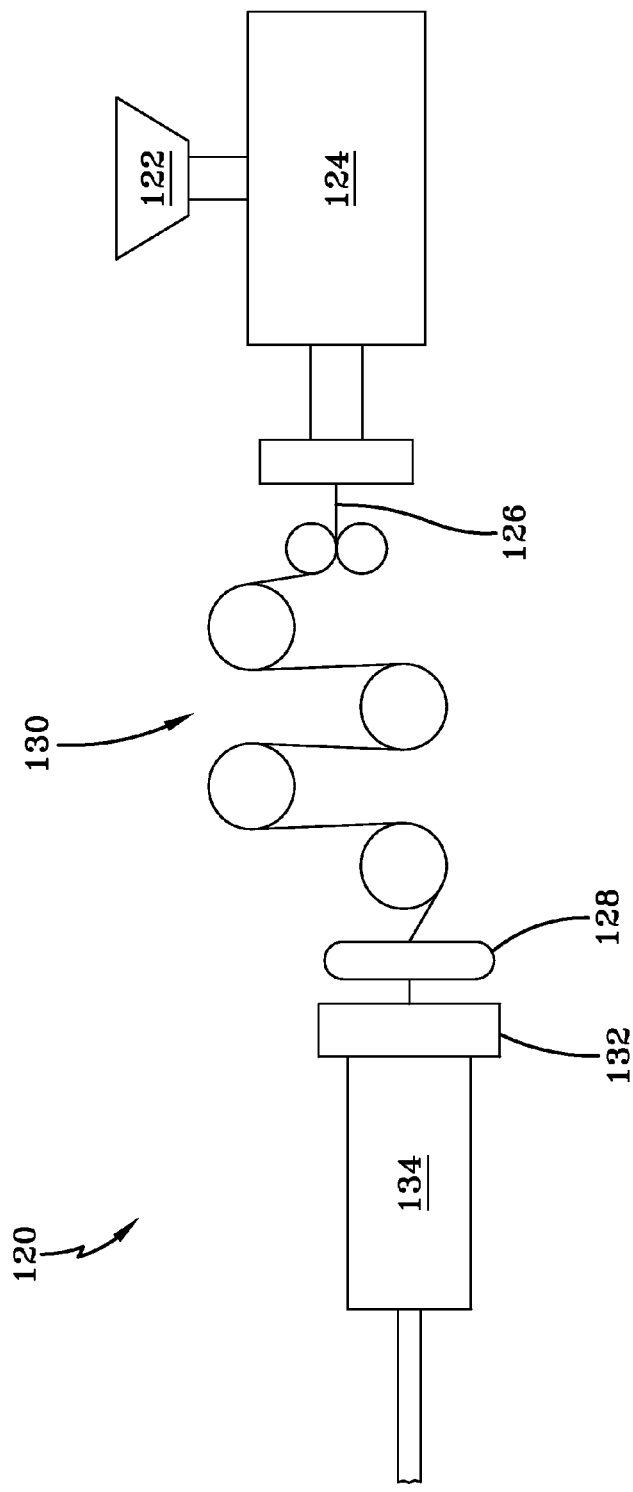
FIG. 5 is a schematic view of one exemplary embodiment of a manufacturing system of the present invention.

FIG. 5 shows one example of an improved extrusion system that may be used to make a siding panel of the present invention. The extrusion system 120 includes at least one hopper 122 that introduces the ingredients of the vinyl composition to the extruder 124. The vinyl 126 exits a die. The vinyl is then passed over at least one cooling roller and/or embosser 130 prior to entering preforming guide or first calibrator 128 and then calibrator 132, which forms the final net shape of the product. The siding panel is then passed through a water bath 134, after which the vinyl siding may be cut to the desired size.

In one exemplary system, the temperature of the vinyl may be controlled such that it is below about 300 degrees Fahrenheit as it enters the calibrator 132. For example, the vinyl may be between about 215 degrees Fahrenheit and about 300 degrees Fahrenheit, more preferably between about 230 degrees Fahrenheit and about 250 degrees Fahrenheit, as it enters the calibrator to be formed into the final net shape of the siding panel. The temperature may be controlled in any suitable or conventional way to achieve the desired temperature of the vinyl. For example, the temperatures of the extruder and/or any preforming guides or intermediate calibrators may be controlled. For another example, the number and temperatures of the cooling rollers and/or embossers may also be controlled. These or other cooling techniques may be used alone or in combination to control the temperature of the vinyl such that it is in a desired temperature range prior to entering the final calibrator.

EXAMPLES

A vinyl siding panel as shown in FIG. 2 was manufactured by extruding a PVC substrate composition and a PVC capstock composition. The extrusion temperature varied between about 340 and about 360 degrees Fahrenheit. After the extruder, the vinyl was passed through a preforming guide and a first calibrator to obtain the general shape of the vinyl siding. The vinyl was then passed through a second calibrator like the one shown in FIG. 3 at a rate of about 48 to about 50 feet per minute to obtain the final net shape of the vinyl siding. Each passageway of the second calibrator had a width of about 6.0 inches, a surface variance of about 0.03125 inch, and a radius curvature of about 148.5 inches. The vinyl siding was then passed under embossing rollers to impart a woodgrain pattern. Thereafter, the vinyl siding was passed under cooling rollers and through a water bath to further cool it down. Each planar portion of the resulting vinyl siding had a thickness of about 0.045 inch, a width of about 6.0 inches, a surface variance of about or less than 0.03125 inch, and a radius curvature of about or more than 148.5 inches. Furthermore, the height of each of the seams connecting the planar portions was about 0.6875 inch.

Figure 6:
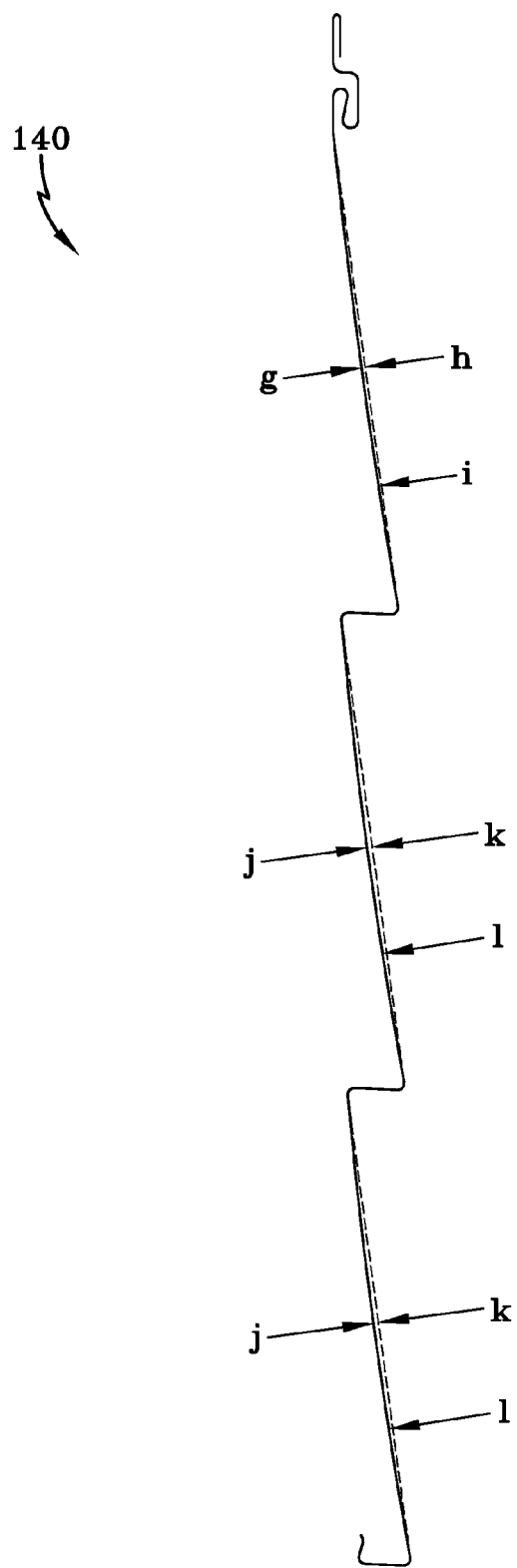
FIG. 6 is a side elevation view of one exemplary embodiment of a siding panel of the present invention.

Another exemplary embodiment of a siding panel is shown in FIG. 6. Each row of the siding panel 140 has a width of about 6.0 inches. The seam height between adjacent rows is about 0.69 inch. As indicated by arrows g and h, the surface variance of the top row is less than about 0.05 inch, more particularly about 0.03 inch. Also, the radius curvature of the top row is about 146 inches as indicated by arrow i. On the other hand, the surface variance of each of the bottom two rows is greater than about 0.05 inch, more particularly about 0.06 inch, as indicated by arrows j and k. Furthermore, the radius curvature of each of the bottom two rows is about 73 inches as indicated by arrow l.

Figure 7:
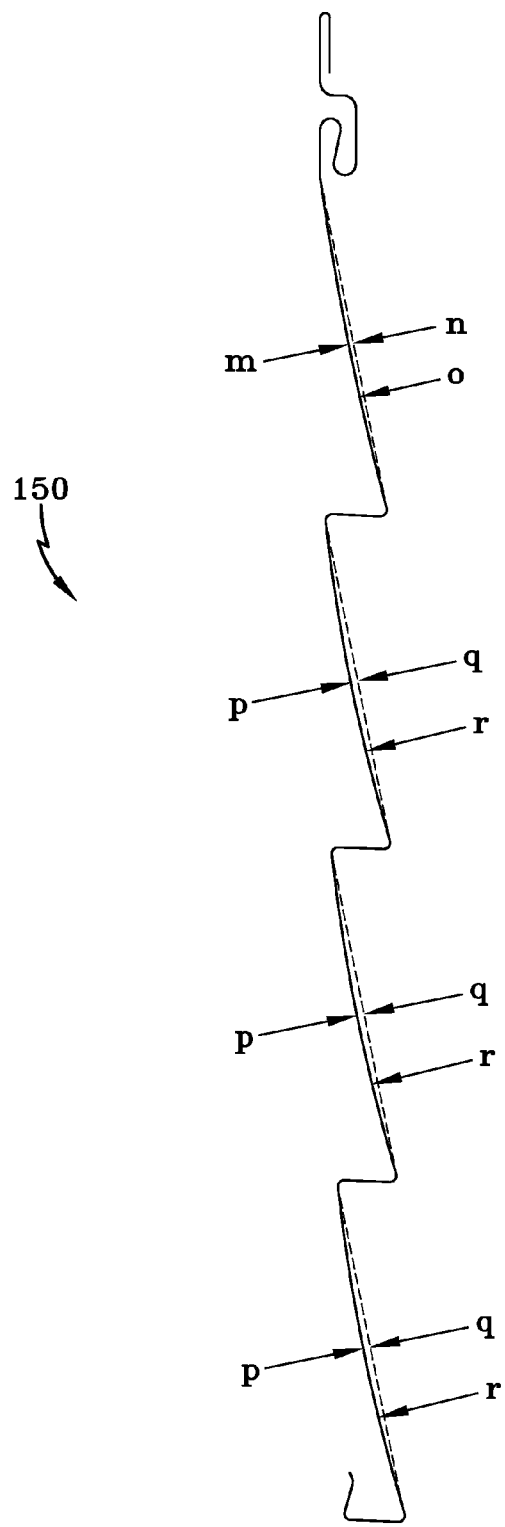
FIG. 7 is a side elevation view of one exemplary embodiment of a siding panel of the present invention.

FIG. 7 shows another exemplary embodiment of the present invention. In this example, each row of the siding panel 150 has a width of about 3.0 inches. The top row has a surface variance of less than about 0.05 inch, more particularly about 0.03 inch, as indicated by arrows m and n. As indicated by arrow o, the radius curvature of the top row is about 35 inches. On the other hand, the surface variance of the bottom three rows is greater than about 0.05 inch, more particularly about 0.06 inch, as indicated by arrows p and q. As indicated by arrow r, the radius curvature of each of the bottom three rows is about 17.5 inches. Additionally, the seam height between adjacent rows is about 0.54 inch in this embodiment of the present invention.

Figure 8:
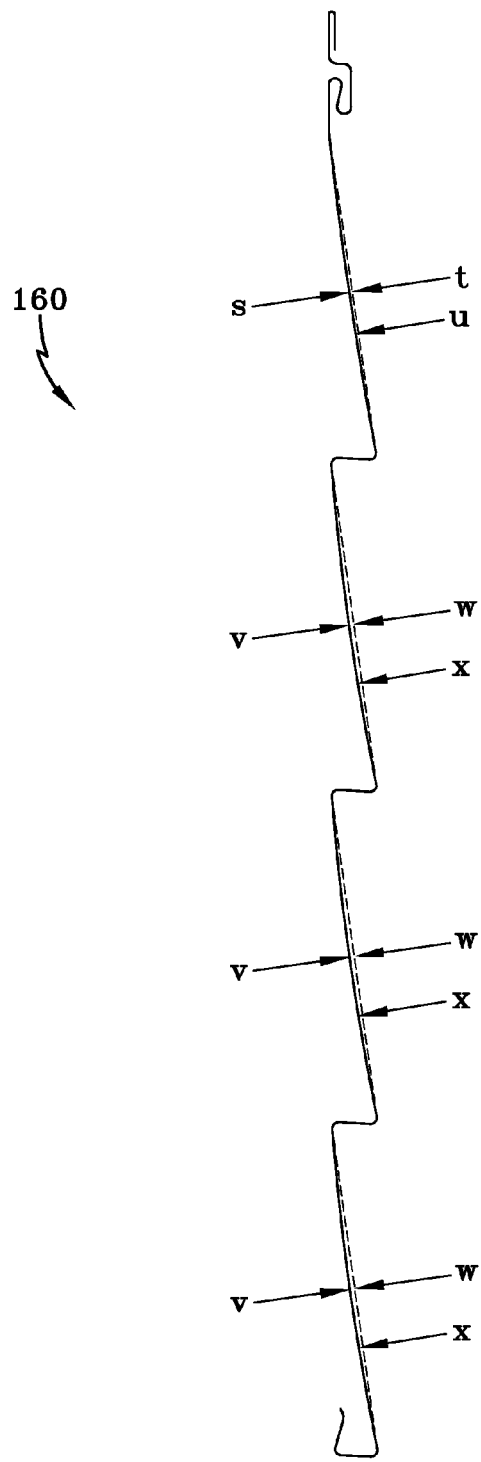
FIG. 8 is a side elevation view of one exemplary embodiment of a siding panel of the present invention.

Yet another exemplary embodiment of a siding panel is shown in FIG. 8. Each row of the siding panel 160 has a width of about 4.0 inches. The seam height between adjacent rows is about 0.54 inch. As indicated by arrows s and t, the surface variance of the top row is less than about 0.05 inch, more particularly about 0.03 inch. Also, the radius curvature of the top row is about 63.5 inches as indicated by arrow u. On the other hand, the surface variance of each of the bottom three rows is greater than about 0.05 inch, more particularly about 0.06 inch, as indicated by arrows v and w. Furthermore, the radius curvature of each of the bottom three rows is about 31.75 inches as indicated by arrow x.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:
1. A siding panel unit comprising:
   a vinyl siding panel comprising:
      a first row having a width of at least about 4 inches from one edge to another edge, said first row having a radius curvature between about 63.5 inches and about 300 inches from said one edge to said another edge; and a second row having a width of at least about 4 inches from one edge to another edge, said second row connected to said first row by a first seam to define a stepped contour, said second row having a radius curvature between about 31.75 inches and about 215 inches from said one edge to said another edge; and a reinforcement panel adjacent to said siding panel, said reinforcement panel having a first portion and a second portion, said first portion adjacent to said first row of said vinyl siding panel and having a radius curvature greater than said radius curvature of said first row of said vinyl siding panel, and said second portion adjacent to said second row of said vinyl siding panel and having a radius curvature greater than said radius curvature of said second row of said vinyl siding panel;

wherein said radius curvatures of said vinyl siding panel are determined prior to said vinyl siding panel being positioned adjacent to said reinforcement panel such that the radius curvature of said first row is greater than the radius curvature of said second row;

wherein said vinyl siding panel is secured to said reinforcement panel such that said radius curvatures of said first row and said second row of said vinyl siding panel are increased; and wherein said siding panel unit has improved resistance to oil canning relative to a similar siding panel unit that has straight siding panel rows with no radius curvature prior to being secured to a reinforcement panel, such that said siding panel unit simulates the appearance of straight face siding.

2. The siding panel unit of claim 1 wherein said first row is a top row of said siding panel.

3. The siding panel unit of claim 1 wherein said first row and said second row each have a surface variance between about 0.01 inch and about 0.1 inch.

4. The siding panel unit of claim 1 wherein said siding panel has a width of at least about 12 inches.

5. The siding panel unit of claim 1 wherein said first row and said second row each have a width between about 4 inches and about 8 inches.

6. The siding panel unit of claim 1 further comprising:
a third row connected to said second row by a second seam to define said stepped contour, said third row having a radius curvature between about 31.75 inches and about 215 inches;
wherein the radius curvature of said first row is greater than the radius curvature of said third row.

7. The siding panel unit of claim 6 wherein the radius curvature of said third row is substantially similar to the radius curvature of said second row.

8. The siding panel unit of claim 6 further comprising:
a fourth row connected to said third row by a third seam to define said stepped contour, said fourth row having a radius curvature between about 31.75 inches and about 215 inches;
wherein the radius curvature of said first row is greater than the radius curvature of said fourth row.

9. The siding panel unit of claim 8 wherein the radius curvature of said fourth row is substantially similar to the radius curvature of said second row and said third row.

10. The siding panel unit of claim 1 wherein an upper portion of said first row is unsecured to said reinforcement panel.

11. The siding panel unit of claim 1 wherein at least one side edge portion of said first row and said second row is unsecured to said reinforcement panel.

12. The siding panel unit of claim 1 further comprising a nailing strip connected to an edge portion of said first row opposite said second row.

13. The siding panel unit of claim 12 wherein said nailing strip is unsecured to said reinforcement panel.

* * * * *